United States Patent [19]

Riess et al.

[11] Patent Number: 4,486,002
[45] Date of Patent: Dec. 4, 1984

[54] COMBINED METALLIC AND FLEXIBLE NON-METALLIC PRESSURE SEAL

[75] Inventors: Ronald L. Riess; Thomas J. Ames, both of Houston, Tex.

[73] Assignee: FMC Corporation, Chicago, Ill.

[21] Appl. No.: 423,383

[22] Filed: Sep. 24, 1982

[51] Int. Cl.³ ............................................. F16K 31/44
[52] U.S. Cl. .................................... 251/214; 277/124; 277/125
[58] Field of Search ........................ 277/123, 124, 125; 251/214

[56] References Cited

U.S. PATENT DOCUMENTS

| | | | |
|---|---|---|---|
| 3,012,802 | 12/1961 | Waite | 277/236 |
| 3,257,095 | 6/1966 | Siver | 251/214 |
| 3,284,089 | 11/1966 | Wrenshall | 277/125 |
| 3,485,142 | 12/1969 | Kutas et al. | 277/124 |
| 4,245,661 | 6/1981 | McGee | 251/214 |
| 4,262,690 | 4/1981 | Binegar | 251/214 |

FOREIGN PATENT DOCUMENTS

| | | | |
|---|---|---|---|
| 627912 | 3/1936 | Fed. Rep. of Germany | 277/123 |
| 358084 | 8/1906 | France | 277/124 |

OTHER PUBLICATIONS

"Oilfield Equipment Catalog, 1980/81", Gray Tool Company (3/80 11R 10M 8/80, pp. 52 & 53).
"Product Data, Armco Nitronic 50 Stainless Steel", Bulletin S-45e, Armco Steel Co.
"Product Data, Armco Nitronic 60 Stainless Steel", Bulletin S-56b, Armco Steel Co.

Primary Examiner—A. Michael Chambers
Attorney, Agent, or Firm—W. W. Ritt, Jr.; Richard B. Megley

[57] ABSTRACT

A fluid pressure seal comprising the combination of a metallic sleeve-like member having one or more annular grooves around its outer periphery and two or more annular grooves on its inner surface, the grooves located to establish an accordion-like area in the member intermediate its ends, and flexible non-metallic sealing material within and filling the grooves. When the seal is installed between two adjacent metallic surfaces, such as around a valve stem and within a chamber in a valve bonnet, axial compression of the seal causes radial expansion of the accordion-like area into fluid-tight contact with those surfaces to produce a metal-to-metal static and dynamic seal therebetween.

11 Claims, 5 Drawing Figures

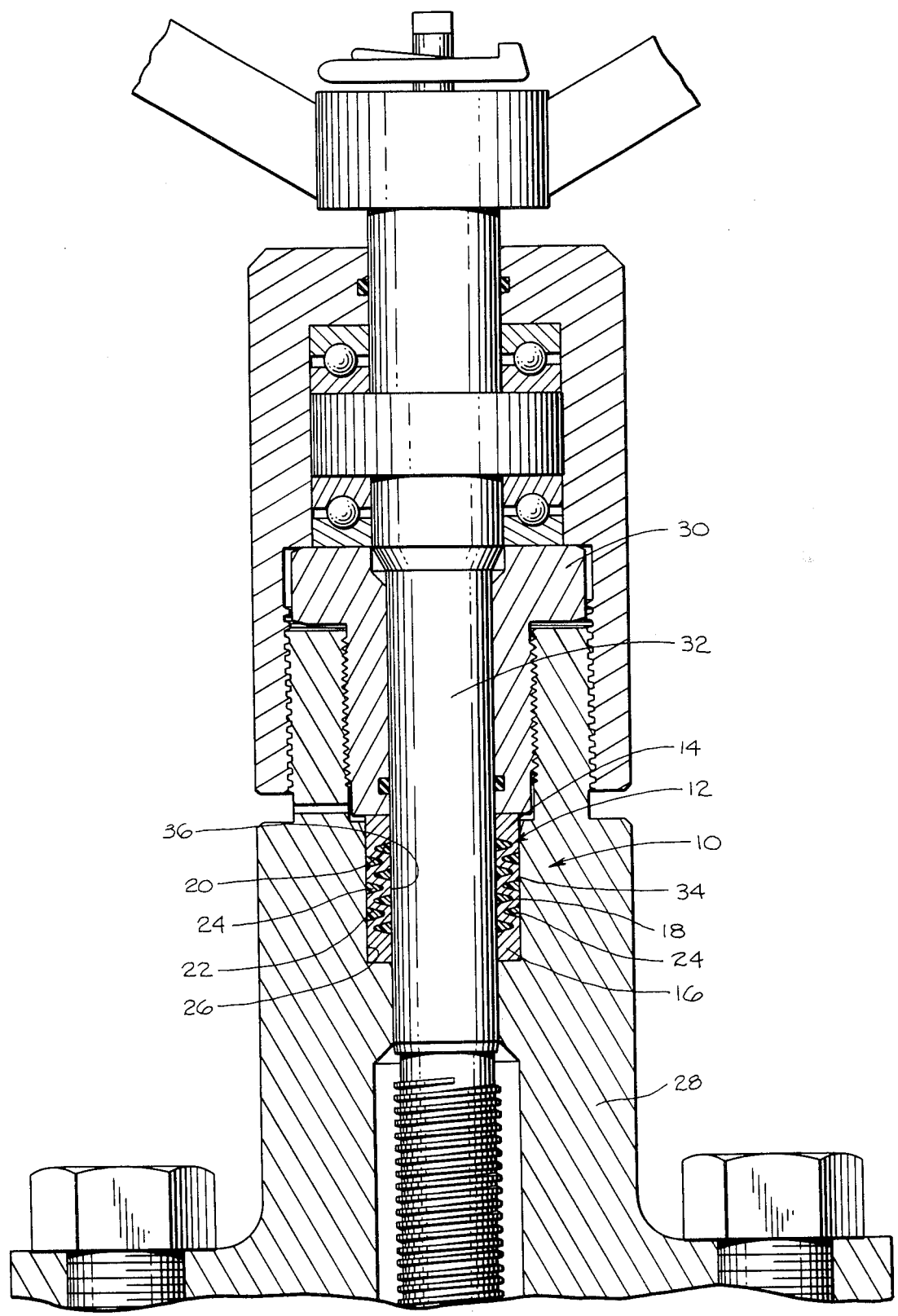
FIG_1

COMBINED METALLIC AND FLEXIBLE NON-METALLIC PRESSURE SEAL

BACKGROUND OF THE INVENTION

This invention relates to fluid seals, and more particularly to such seals capable of functioning under dynamic as well as static conditions to prevent leakage of any fluid, corrosive or non-corrosive, throughout a wide temperature and pressure range, and especially following subjection to a fire.

In the oil and gas industry, due to encountering more corrosive well conditions, higher pressures and increasing temperatures, requirements have arisen for better and safer seal systems for use in oilfield equipment. The prior art is replete with descriptions of static seals for preventing undesired escape of fluids, both corrosive and non-corrosive, to the environment at widely ranging temperatures and pressures, and of dynamic seals also designed to function under somewhat similar adverse conditions. Although many of these known seals have been employed successfully, they all have one or more limitations that preclude satisfactory performance under a combination of unusual and relatively extreme conditions that are presented when, for example, the seal is employed between the rotatable stem and the bonnet of a valve on an oil or gas well christmas tree, and the tree is involved in a fire. In such a circumstance, if the seal is of elastomeric or other non-metallic construction the fire destroys it, usually resulting in grave or even disastrous consequences. If, on the other hand, the seal is all-metallic it may function satisfactorily in a static condition, but the high friction forces created when the seal is forced into fluid-tight contact with the stem and the bonnet or other surrounding metal surface prevent rotation of the stem and thus movement of the valve's flow control element between open and closed positions.

Accordingly, there exists a need for a fire-safe metal-to-metal seal system that will function both statically and dynamically to prevent the escape of corrosive and other fluids over a wide range of temperatures and pressures, and that will not unmanageably restrict relative movement of the valve or other elements between which the seal functions. It is to satisfy this need that the present invention is directed.

SUMMARY OF THE INVENTION

The present invention comprises a combined metallic and non-metallic seal element that when properly installed between two metallic surfaces, such as between the stem and the bonnet of a valve, will establish and maintain a metal-to-metal fluid-tight sealing system between said surfaces under both static and dynamic (axial and rotational movement) conditions, in the presence of corrosive materials, and during and after exposure to a wide range of temperatures including those existent, for example, when the valve is subjected to an oil or gas well fire.

In the illustrated versions of this invention the seal element comprises an annular metallic sleeve-like member with at least one groove around its outer periphery and at least two grooves around its inner surface, the grooves located to establish an accordion-like area in the member intermediate its ends, and flexible non-metallic material within and filling the grooves. The surfaces of the grooves can be angular, arcuate or otherwise curved, or can comprise both angular and curved configurations, and the number of grooves can be increased to provide desired results. The flexible non-metallic material, which can be injection molded into the grooves or fitted therein in other manners, can comprise an elastomer such as neoprene or a nitrile rubber, a plastic such as Teflon or Viton, or other suitable composition compatible with the fluid medium sought to be contained. The metallic member of the seal element can be constructed from various metals such as, for example, austenitic stainless steels including 304, 316, and other such steels which have the requisite properties of corrosion resistance, low galling, resistance to wear, and strength.

A seal element according to the present invention can be used not only to seal between the stem and bonnet of a gate, plug or ball valve, but also to statically and dynamically seal other stems as well as shafts, pipes, couplings, joints, flanges, pistons, bores and further apparatus wherein a fluid medium is to be contained and not allowed to leak to the atmosphere or another chamber.

BRIEF DESCRIPTION OF THE DRAWINGS

FIG. 1 is a fragmentary view, partially in central section, of the upper portion of a gate valve shown a seal element according to the present invention in functional position between the valve stem and valve bonnet.

DESCRIPTION OF THE PREFERRED EMBODIMENT

Figure 2:
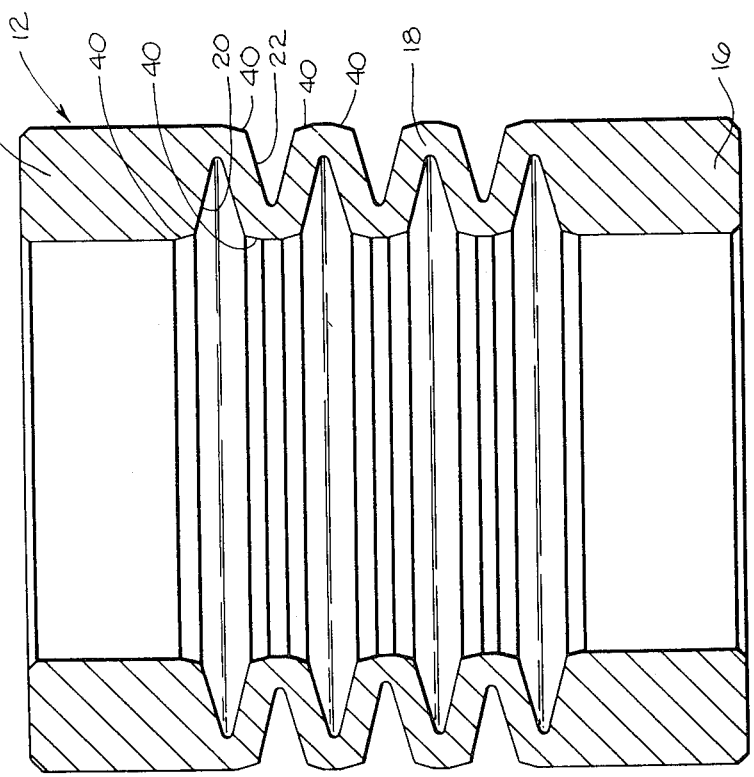
FIG. 2 is a central section, on an enlarged scale, of the metallic sleeve-like member of the seal element of FIG. 1 prior to installation.

In reference first to FIGS. 1 and 2, a seal element 10 according to the present invention comprises a metallic sleeve-like member 12 having upper and lower end portions 14, 16 and a central portion 18 with inner and outer annular grooves 20, 22, and a plurality of flexible non-metallic rings 24 that fit within and fill the grooves 20, 22.

This seal element 10 is intended for installation in a recess, such as the cylindrical seal chamber 26 in the bonnet 28 of the gate valve represented in FIG. 1, and then loaded axially by a packing nut 30 or other suitable means that is threaded into the upper end of the bonnet. As the axial load is applied to the metallic member 12 this member is compressed in an axial direction, whereby the width W (FIG. 3) of the grooves 20, 22 is diminished and the flexible non-metallic rings 24 are forced into fluid-tight contact between the metallic member 12 and the adjacent surfaces of the seal chamber 26, and also between the member 12 and the valve stem 32 around which the seal element 10 resides, thereby producing a seal between the bonnet and stem that is effective for low and high pressures. Axial compression of the seal element 10 also forces the outer surfaces 34 of the metallic member 12 that are located at the edge areas of the outer grooves 22, into fluid-tight contact with the adjacent surface of the seal chamber 26, and likewise forces corresponding inner surfaces 36 of the metallic member 12 into fluid-tight contact with the adjacent surface of the stem 32, thus producing a true metal-to-metal seal between the bonnet and stem that also is effective at low and high pressures.

Accordingly, when the seal element 10 of the present invention is subjected to conditions that are not destructive of the non-metallic rings 24 an effective fluid-tight seal is readily established and maintained, and if this seal element should be subjected to fire or chemical attack, whereby the non-metallic rings are damaged or destroyed, the metal-to-metal seal will remain intact. This improvement over previous seal systems is especially advantageous when employed in equipment where fire is an ever-present possibility and/or highly corrosive fluids are commonly encountered, such as in oil and gas well equipment, nuclear power equipment, apparatus for use in the chemical industry, to cite a few examples.

Figure 3:
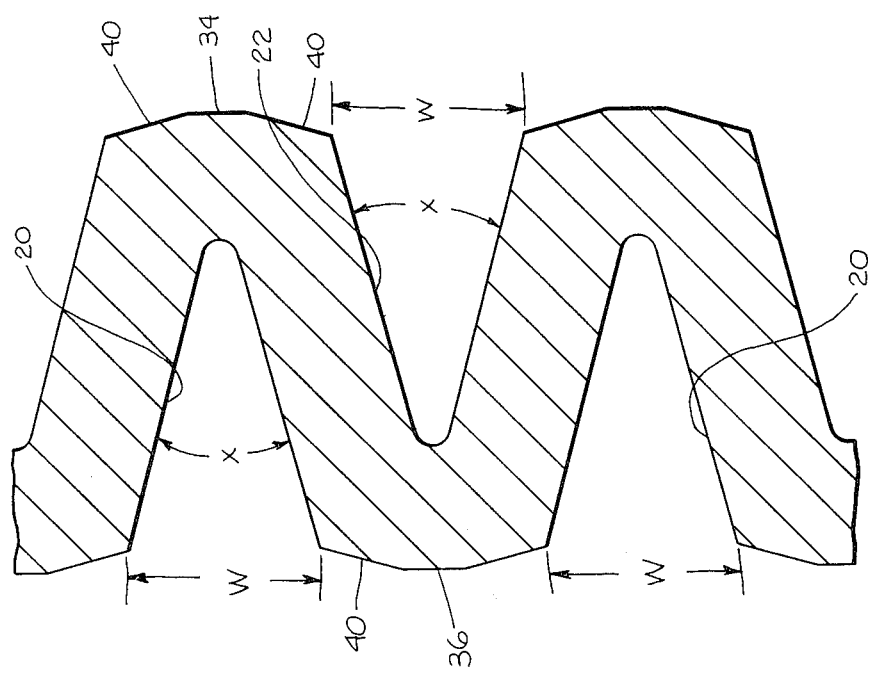
FIG. 3 is a fragmentary view, on an enlarged scale, of a portion of the metallic member of FIG. 2, showing the configuration of the grooves.

As indicated in FIG. 3, the magnitude of the angle X defined by the sides of the grooves 20, 22 is dependent upon the amount of axial compression of the metallic member 12 that is required to establish the desired fluid-tight metal-to-metal seal between the member 12 and the bonnet 28 and stem 32. In environments such as that illustrated in FIG. 1, it has been determined that angles of up to approximately 35 degrees are suitable for producing a dynamic and static seal of this design. If, on the other hand, only a static seal is desired, the angle X can be increased substantially beyond 35 degrees.

The clearance between the metallic element 12 and the adjacent surfaces of the chamber 26 and stem 32 also is a factor in determining the size of the angle X; since the greater the clearance the greater is the angle required to facilitate axial compression sufficient to cause the surfaces 34, 36 to contact and establish a fluid-tight seal with the aforesaid adjacent chamber and stem surfaces.

As illustrated best in FIGS. 2 and 3, the edges of the grooves 20, 22 are preferably chamfered at 40 in order to facilitate rotational or axial movement of the stem 32 with less effort than that required if no chamfers are present. However, it should be understood that the seal element of the present invention will function as both a dynamic and a static seal if the groove edges are not chamfered, or if they have other configurations.

Figure 5:
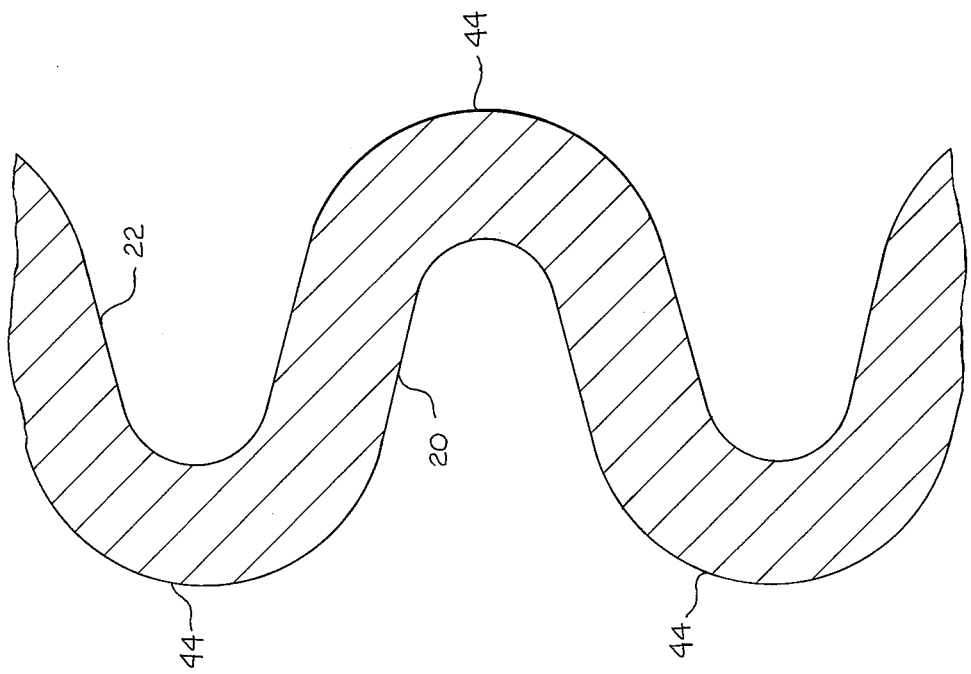
FIGS. 4 and 5 are views similar to FIG. 3 but showing additional groove configurations.
Figure 4:
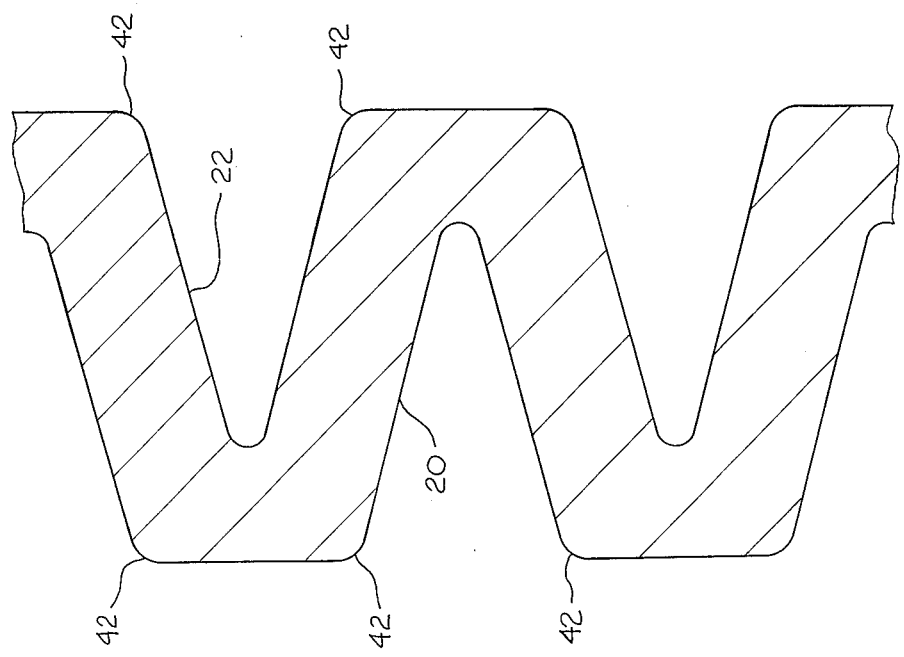

EMBODIMENTS OF FIGS. 4 and 5

FIGS. 4 and 5 illustrate variations in groove configurations of the metallic sleeve-like element 12 of FIGS. 2 and 3, these variations also resulting in a seal element that functions satisfactorily for both static and dynamic purposes.

In the FIG. 4 embodiment the edges of the grooves 20, 22 are radiused at 42, and in the FIG. 5 embodiment the total surface of the edges is curved, as showed at 44. In both embodiments, sufficient contact between the edges 42, 44 and the adjacent metal surfaces of the stem 32 and bonnet 28 to produce the desired metal-to-metal fluid-tight seal is assured.

Although the best mode contemplated for carrying out the present invention has been herein shown and described, it will be apparent that modification and variation may be made without departing from what is regarded to be the subject matter of the invention.

We claim:
1. A combined metallic and flexible non-metallic dynamic and static seal element for preventing fluid leakage between opposed inner and outer annular metallic surfaces through a wide temperature and pressure range, comprising
   a. a sleeve-like metallic member with at least one annular groove on its outer periphery and at least two annular grooves on its inner surface, said grooves located to establish an accordion-like portion in the member intermediate its ends, said accordion-like portion including a plurality of annular sealing surfaces for establishing a metal-to-metal seal with said inner and outer metallic surfaces, and
   b. flexible non-metallic sealing material within and filling said grooves,
   whereby when said seal element is positioned between said outer and inner metallic surfaces and subjected to an axial compressive force a fluid-tight metal-to-metal seal is established between said annular sealing surfaces and said inner and outer metallic surfaces.
2. A seal element according to claim 1 wherein the surfaces of the grooves are angular.
3. A seal element according to claim 2 wherein the angle defined by the sides of at least one groove is within the range of twenty-five to thirty-five degrees.
4. A seal element according to claim 3 wherein the angle is between twenty-eight and thirty-two degrees.
5. A seal element according to claim 1 wherein the surfaces of the grooves are curved.
6. A seal element according to claim 1 wherein the surfaces of the grooves include both angular and curved portions.
7. A seal element according to claim 1 including at least three grooves on its outer periphery and at least four grooves on its inner surface.
8. A seal element according to claim 1 wherein the metallic member has angular grooves with chamfered edges.
9. A seal element according to claim 8 wherein the non-metallic sealing material includes Teflon.
10. A seal element according to claim 8 wherein the non-metallic sealing material includes an elastomer.
11. In a fluid flow control valve including a bonnet, a stem extending through the bonnet, a sleeve-like stem seal between the stem and the bonnet, and means connected to the bonnet for exerting an axial compressive force on the stem seal, the improvement comprising
   a. a metallic and accordion-shaped portion in the stem seal intermediate the ends thereof, said portion including at least one annular groove on its outer periphery and at least two annular grooves on its inner surface, said portion further including a plurality of annular sealing surfaces for establishing a metal-to-metal seal with said bonnet and stem, and
   b. flexible non-metallic sealing material within and filling said grooves,
   said sealing surfaces responding to said axial compressive force by establishing a metal-to-metal seal with the adjacent surfaces of said stem and said bonnet.

* * * * *